United States Patent
Fert

Patent Number: 5,500,677
Date of Patent: Mar. 19, 1996

[54] DEVICE FOR ENCODING DIGITAL SIGNALS REPRESENTING IMAGES, AND CORRESPONDING DECODING DEVICE

[75] Inventor: Etienne Fert, Paris, France

[73] Assignee: U.S. Philips Corporation, New York, N.Y.

[21] Appl. No.: 483,916

[22] Filed: Jun. 7, 1995

Related U.S. Application Data

[63] Continuation of Ser. No. 143,793, Oct. 27, 1993, abandoned.

[30] Foreign Application Priority Data

Oct. 28, 1992 [FR] France ................... 92 12880

[51] Int. Cl.⁶ .................................. H04N 7/40
[52] U.S. Cl. ............... 348/402; 348/405; 348/416; 348/411; 348/419
[58] Field of Search .................. 348/413, 416, 348/419, 405, 699, 402, 700, 462

[56] References Cited

U.S. PATENT DOCUMENTS

| | | | |
|---|---|---|---|
| 4,864,397 | 9/1989 | Zehner | 348/414 |
| 4,958,226 | 9/1990 | Haskell et al. | 348/397 |
| 5,046,071 | 9/1991 | Tanoi | 348/402 |
| 5,155,593 | 10/1992 | Yonemitsu et al. | 348/407 |
| 5,159,448 | 10/1992 | Kojima | 348/408 |
| 5,173,773 | 12/1992 | Ueda et al. | 348/415 |
| 5,237,410 | 8/1993 | Inoue | 348/402 |
| 5,253,058 | 10/1993 | Charavi | 348/409 |
| 5,260,782 | 11/1993 | Hui | 348/409 |
| 5,349,383 | 9/1994 | Parke et al. | 348/416 |
| 5,412,484 | 5/1995 | Yoshikawa | 348/402 |

FOREIGN PATENT DOCUMENTS

| | | |
|---|---|---|
| 0448491 | 9/1991 | European Pat. Off. . |
| 0474100 | 3/1992 | European Pat. Off. ......... H04N 7/13 |

*Primary Examiner*—Tommy P. Chin
*Assistant Examiner*—Anand S. Rao
*Attorney, Agent, or Firm*—Laurie E. Gathman; Mike Marion

[57] ABSTRACT

A device for encoding digital signals corresponding to images which are subdivided into blocks has a first encoding channel including a discrete cosine transform circuit. In addition to this first encoding channel the device has a second encoding channel which encodes the differences between the original coefficients present at the output of the discrete cosine transform circuit and the same coefficients after quantization and inverse quantization. This second channel encodes the differences after they are quantized with a finer quantization step than in the first encoding channel. The device further includes a prediction channel including a motion compensation stage, that uses both the inverse quantized coefficients coded in the first encoding channel and the inverse quantized coefficients coded in the second encoding channel to produce a predicted digital signal. This predicted digital signal is subtracted from the digital signal to be encoded by the device.

4 Claims, 2 Drawing Sheets

DEVICE FOR ENCODING DIGITAL SIGNALS REPRESENTING IMAGES, AND CORRESPONDING DECODING DEVICE

This is a continuation of application Ser. No. 08/143,793, filed Oct. 27, 1993, now abandoned.

BACKGROUND OF THE INVENTION

The invention relates to a device for encoding digital signals corresponding to images subdivided into blocks, which device is composed of a first encoding channel comprising a discrete cosine transform circuit, a quantizing circuit having a determined first quantization step, a variable-length encoding circuit, a buffer memory supplying encoded signals having a determined quality level, and a rate control circuit, a prediction channel comprising, at the output of said quantizing circuit, a first inverse quantizing circuit, an inverse discrete cosine transform circuit, a first adder, a picture memory, a motion compensation stage, and a subtracter for subtracting the predicted output signals of said stage from said digital signals to be encoded, and a second encoding channel comprising a circuit for computing the differences on the basis of signals downstream of the discrete cosine transform circuit, a circuit for quantizing these differences with a second quantization step which is finer than the first step, and a circuit for encoding the differences thus quantized. The invention is particularly applicable in the field of distributing television pictures having two image quality levels and is compatible with the MPEG standard.

For transmitting images in a digital channel, it is necessary to compress the information contained in these images, while taking the rate of the existing channels into account. For this purpose there are numerous encoding techniques and one of the most currently used techniques is a successive mathematical transform referred to as discrete cosine transform (DCT), followed by a quantization of coefficients obtained by said transform and a variable-length encoding of the values thus quantized, which operations are completed by a prediction of motion of images. The temporal prediction is performed on the basis of said quantized values and, upon encoding, does not present the signals which correspond to each current image but signals which are representative of the differences between this current image and the preceding image, while taking the motion between these two images in the time interval separating them into account.

A device of this type is described in U.S. Pat. No. 4,958,226. Its structure, including initially the first encoding channel and the prediction channel for obtaining a first image quality level, also comprises a second channel for encoding a value referred to as residual error and taken from said first encoding channel. The image which is subsequently decoded and restored thus benefits from complementary information by which a second image quality level can be obtained.

SUMMARY OF THE INVENTION

It is an object of the invention to provide a perfected encoding device by which this second image quality level can even be improved.

To this end the invention relates to an encoding device as described in the opening paragraph, which is characterized in that the prediction channel also comprises, between the output of said circuit for quantizing the differences and said inverse discrete cosine transform circuit, a supplementary branch comprising a second circuit for inverse quantization of the output signals of said circuit for quantizing the differences, and a second adder for adding the output signals of said first and second inverse quantizing circuits, the output of said second adder being connected to the input of said inverse discrete cosine transform circuit.

The structure thus proposed consists of arranging a supplementary feedback branch in the encoder, which branch takes the information components processed by the second encoding channel so as to combine them with those processed by the prediction channel, thus ensuring a more accurate prediction.

It is another object of the invention to provide a device for decoding signals which have been previously encoded by means of an encoding device of the structure as defined hereinbefore.

According to the invention, this decoding device, composed of a first decoding channel comprising, in series, a variable-length decoding circuit, a third inverse quantizing circuit operating in accordance with said determined quantization step, an inverse discrete cosine transform circuit, and a motion compensation stage comprising a motion compensation circuit, and a third adder, a first input of which receives the output signal of said inverse discrete cosine transform circuit and a second input of which receives the output signal of said motion compensation circuit and which supplies the decoded signals applied to the output of the decoding device and, via a picture memory, to the input of said motion compensation circuit, is characterized in that it comprises a second decoding channel comprising, in series, a second variable-length decoding circuit, a fourth inverse quantizing circuit operating in accordance with said quantization step which is finer than the first step, and a fourth adder whose two inputs receive the output signals of said third and fourth inverse quantizing circuits and whose output signals are applied to the input of said inverse discrete cosine transform circuit.

These and other aspects of the invention will be apparent from and elucidated with reference to the embodiments described hereinafter.

DETAILED DESCRIPTION OF THE PREFERRED EMBODIMENTS OF THE INVENTION

Figure 1:
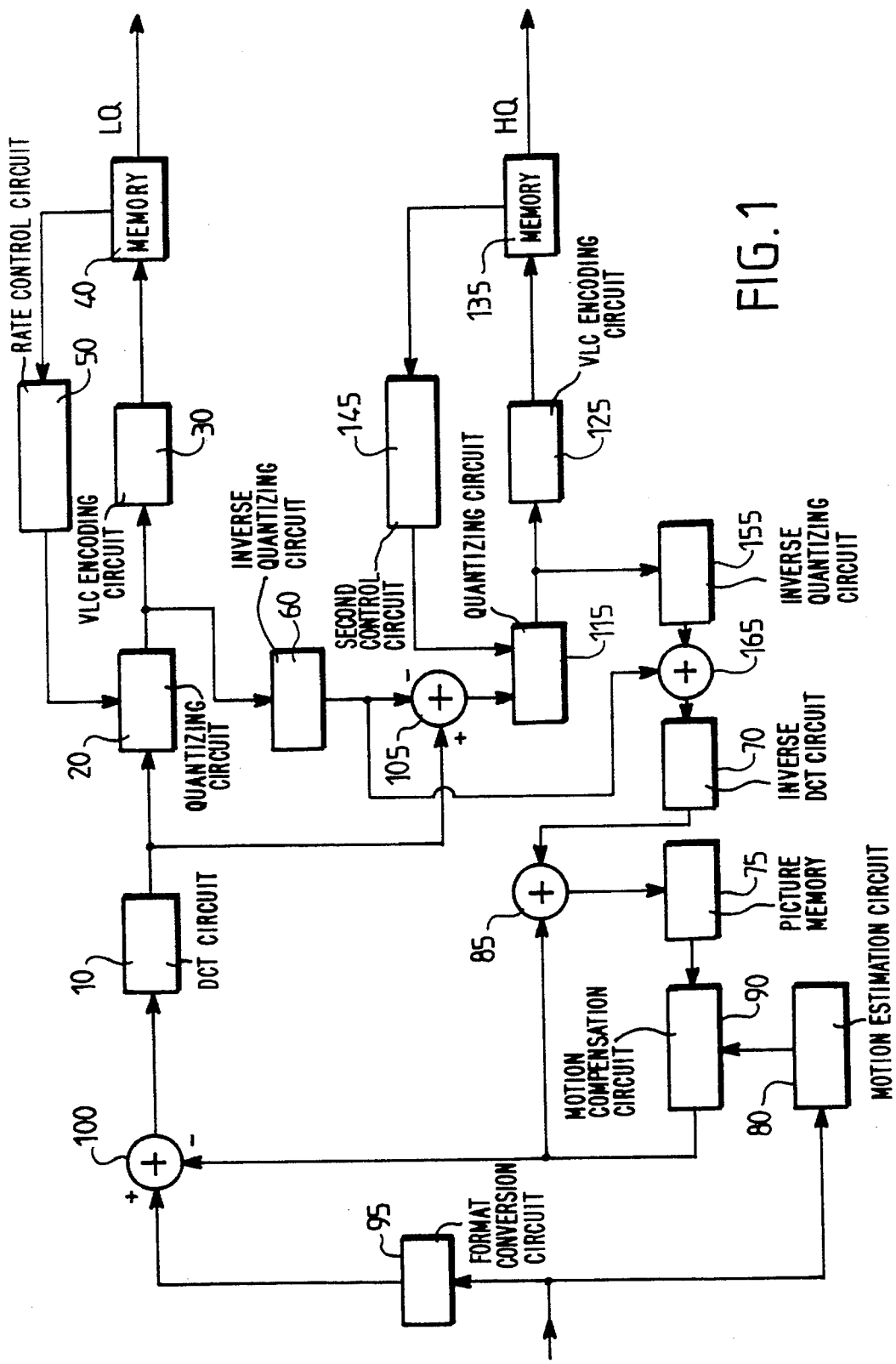
FIG. 1 shows an embodiment of an encoding device according to the invention.

The encoding device shown in FIG. 1 comprises a discrete cosine transform circuit 10. This transform, which is effected with picture blocks having a format of 8×8 pixels, ensures the conversion of digital signals received at its input (and corresponding to pictures) into a block of 8×8 coefficients, the first of which represents the average value of the grey levels of the pixels of the block under consideration and the other sixty-three coefficients represent the different spatial frequencies in this block.

A quantizing circuit 20 ensures the quantization of each of these output coefficients of the circuit 10. This quantization is related to the position of the coefficient considered in the 8×8 block (the high spatial frequencies are less perceptible to the human eye and the quantization of the corresponding coefficients may thus be effected with a larger quantization step giving a less precise quantization) and is related to a quantization factor which is dependent on the rate as described hereinafter. The quantization values obtained are subsequently applied to a variable-length encoding circuit 30 whose output is connected to a buffer memory 40 for storing the encoded words. As a function of filling this memory 40, a rate control circuit 50 arranged at the output of said memory applies the above-mentioned quantization factor to the quantizing circuit 20, and the quantization step can be modified by means of the filling-related value of this factor in such a way that said memory 40 neither overflows nor is emptied. Such an encoding chain using rate control is described, for example, in European patent application EP 0 448 491 and is thus not advantageous in this case. The output signals of the memory 40 are encoded signals which correspond to a given quality level, denoted LQ in FIG. 1.

The quantization values obtained are also applied to a prediction channel comprising, first of all, an inverse quantizing circuit 60. The difference between the original coefficients present at the output of the discrete cosine transform circuit 10 and the same coefficients after quantization followed by inverse quantization at the output of the circuit 60 can be computed by means of a subtracter 105. For a finer quantization and for encoding these new quantized values, these differences are subsequently applied to a second encoding chain. In a manner similar to the manner described hereinbefore, this second encoding chain comprises a second quantizing circuit 115 having a finer quantization step than that of the first quantizing circuit, followed by a second variable-length encoding circuit 125 whose output is connected to a buffer memory 135. As a function of filling this memory 135, a second control circuit 145 applies a quantization factor to the second quantizing circuit 115. As described hereinbefore, this factor combines its effects with those of the choice of the quantization step for ensuring the rate control of memory 135. Because of the finer complementary quantization realised by the circuit 115, the output signals of this memory 135 are encoded signals which correspond to a quality level denoted HQ which is higher than that at the output of the first memory 40.

In accordance with the invention, the sum of the coefficients present at the output of the inverse quantizing circuit 60 and the coefficients present at the output of a second inverse quantizing circuit 155 arranged at the output of the second quantizing circuit 115 can be computed by means of an adder 165. This sum is applied to the prediction channel, more specifically to an inverse discrete cosine transform circuit 70 ensuring an inverse conversion of the conversion performed by the circuit 10, i.e. restoring the digital signals corresponding to the 8×8 pixel blocks on the basis of the DCT coefficients. These signals are applied to a first input of an adder 85 whose output signal is stored in a picture memory 75.

The output signal of this memory 75 is applied to a motion compensation stage which comprises a motion estimation circuit 80 and a motion compensation circuit 90 (it is this circuit 90, a first input of which receives the output signal of said memory 75). The circuit 80 receives the digital input signals from the encoding device and determines, for each picture block, a displacement vector which is representative of its motion with respect to the corresponding block of the preceding image (this determination is known as block matching). The vector thus determined is applied to the second input of the motion compensation circuit 90 which supplies a predicted block whose difference with the preceding block is determined in a subtracter 100 preceding the discrete cosine transform circuit 10. The predicted block is also applied to a second input of the adder 85.

A first input of the subtracter 100 receives the output signal of a format conversion circuit 95 which receives the digital input signals from the device corresponding to pictures to be presented in the form of blocks at its output. The digital signals present at the input of the circuit 10 are thus not the input signals of the encoding device corresponding to successive picture blocks, but signals representing the difference between each original picture block and the predicted block which is deducted therefrom after the operations performed in the prediction channel (between the input of the inverse quantizing circuit 60 and the output of the motion compensation circuit 90).

In the absence of elements 105 to 165, the channel which comprises the circuits 60, 70, 75, 80, 85, 90 would constitute a conventional prediction channel. With the arrangement of the elements 105 to 165, an improved, finer quantization can be performed, on the basis of which the complementary encoding operation is performed, which leads to encoded signals of a better quality at the output of the memory 135 and to a finer prediction as compared with said conventional prediction.

The present invention is not limited to the embodiments described and shown. The invention also relates to a decoding device which is suitable for decoding signals previously encoded by means of a device as shown in FIG. 1.

Figure 2:
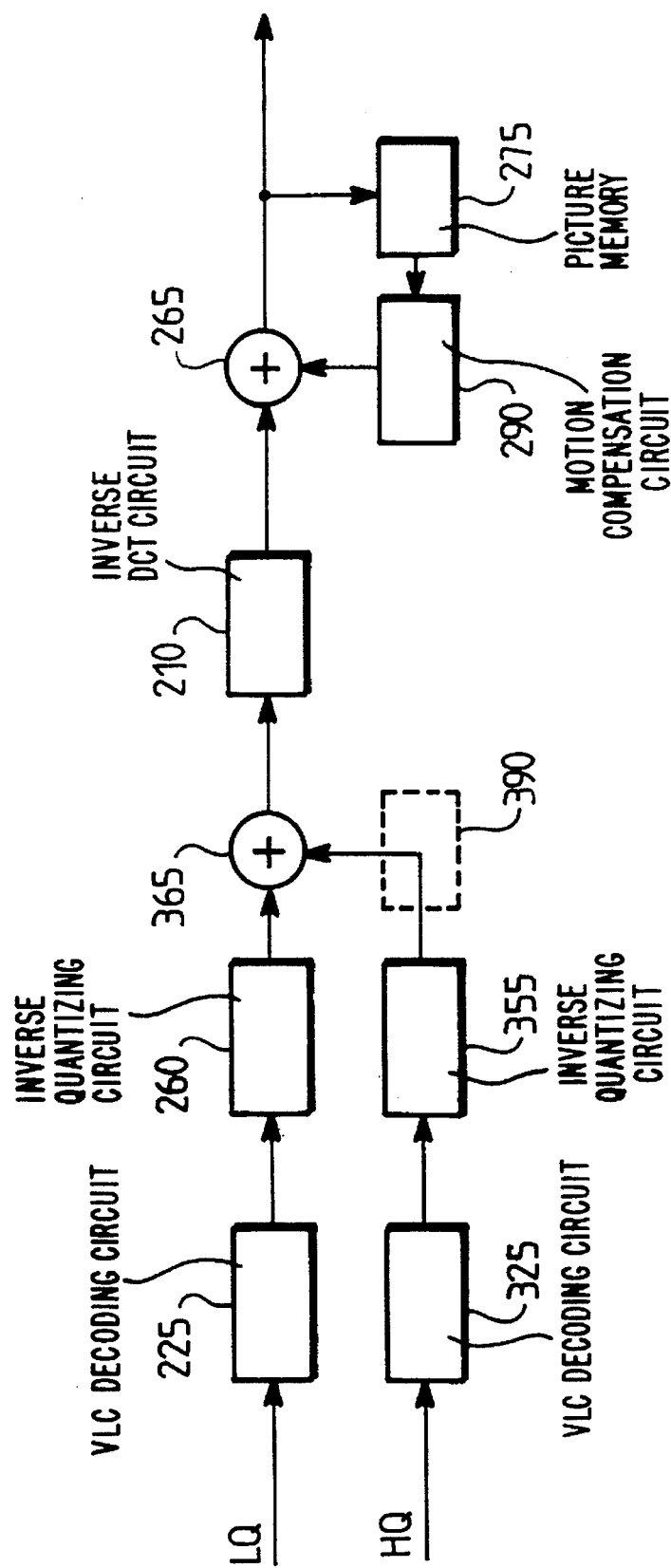
FIG. 2 shows an embodiment of a decoding device according to the invention.

An embodiment of such a decoding device is shown in FIG. 2. In this embodiment, this device has a first decoding channel comprising, in series, a variable-length decoding circuit 225, a third inverse quantizing circuit 260 operating in accordance with the determined quantization step, an inverse discrete cosine transform circuit 210 and a motion compensation stage. This stage comprises a motion compensation circuit 290 supplying the prediction information, likewise as at the encoding operation, and a third adder 265 whose two inputs receive the output signal of the inverse quantizing circuit and that of said motion compensation circuit. This adder 265 supplies the decoded signals applied to the output of the decoding device and, via a picture memory 275, to the input of said motion compensation circuit. The decoding device also has a second decoding channel comprising, in series, a second variable-length decoding circuit 325, a fourth inverse quantizing circuit 355 operating in accordance with the quantization step which is finer than the first step, and a fourth adder 365. The two inputs of this adder receive the output signals from said third and fourth inverse quantizing circuits 260 and 355 and its output signals are applied to the input of the inverse discrete cosine transform circuit 210.

In this decoding device, the first decoding channel receives the corresponding encoded signals at the determined quality level denoted LQ hereinbefore, and the second decoding channel receives the corresponding encoded signals at the improved quality level denoted HQ hereinbefore. The addition of information components thus decoded in each of the two channels provides the possibility of reconstructing pictures having this improved quality level at the output of the decoding device. If, for whatever reason, only the encoded signals LQ are received, which signals are subject to a protection level that has increased during their transmission, the second decoding channel can be rendered inoperative by means of a switch 390 shown in broken lines in FIG. 2. This FIG. 2 is shown in the form of a conventional circuit diagram with a single decoding channel receiving said encoded signals LQ and only supplies reconstructed pictures having said determined quality level LQ.

I claim:

1. An encoding device for encoding a digital signal corresponding to images subdivided into blocks, comprising:

a discrete cosine transform circuit for processing a first digital signal to obtain first coefficients;

a first quantizing circuit for quantizing the first coefficients to obtain first quantized values, said first quantizing circuit having a first quantization step;

a first encoding circuit for encoding the first quantized values to obtain first encoded signals having a first quality level;

a first inverse quantization circuit for dequantizing the first quantized values to obtain first dequantized coefficients;

a first subtracter for subtracting the first dequantized coefficients from the first coefficients to obtain second coefficients;

a second quantizing circuit provided in cascade with the first quantizing circuit for quantizing the second coefficients to obtain second quantized values, said second quantizing circuit having a second quantization step which is finer than the first quantization step;

a second encoding circuit for encoding the second quantized values to obtain second encoded signals having a second quality level, which is higher than the first quality level;

a second inverse quantization circuit for dequantizing the second quantized values to obtain second dequantized coefficients;

a first adder circuit for adding the first dequantized coefficients and the second dequantized coefficients to obtain third coefficients;

an inverse discrete cosine transform circuit for processing the third coefficients to obtain a third digital signal;

a second adder circuit for adding the third digital signal and a predicted digital signal to obtain a fourth digital signal;

a picture memory for storing and supplying the fourth digital signal;

a motion compensation stage for operating on the fourth digital signal to produce the predicted digital signal; and a second subtracter circuit for subtracting the predicted digital signal from the digital signal to obtain the first digital signal.

2. A encoding device as claimed in claim 1, further comprising:

a first buffer memory for storing and supplying the first encoded signals;

a first rate control circuit for supplying the first quantization step to the first quantizing circuit;

a second buffer memory for storing and supplying the second encoded signals; and a second rate control circuit for supplying the second quantization step to the second quantizing circuit, 3. A decoding device for decoding signals previously encoded by means of an encoding device as claimed in claim 1, comprising:

a first decoding circuit for decoding a reproduction of the first encoded signals to obtain first decoder quantized values;

a first decoder inverse quantization circuit for dequantizing in accordance with the first quantization step the first decoder quantized values to obtain first decoder dequantized coefficients;

a second decoding circuit for decoding a reproduction of the second encoded signals to obtain second decoder quantized values;

a second decoder inverse quantization circuit for dequantizing in accordance with the second quantization step the second decoder quantized values to obtain second decoder dequantized coefficients;

a first decoder adder circuit for adding the first decoder dequantized coefficients and the second decoder dequantized coefficients to obtain third decoder quantized coefficients;

a decoder inverse discrete cosine transform circuit for processing the third coefficients to obtain a first decoder digital signal;

a second decoder adder circuit for adding the first decoder digital signal and a second decoder digital signal to obtain a third decoder digital signal;

a picture memory for storing and supplying the third decoder digital signal; and a motion compensation stage for operating on the third decoder digital signal to obtain the second decoder digital signal;

4. A decoding device as claimed in claim 3 comprising:

a switch arranged between said second decoder inverse quantization circuit and said first decoder adder circuit for rendering an influence of the second decoder dequantized coefficients on the third coefficients inoperative.

* * * * *